(12) United States Patent
Takeuchi et al.

(10) Patent No.: US 7,504,943 B2
(45) Date of Patent: Mar. 17, 2009

(54) OBJECT DETECTING APPARATUS

(75) Inventors: Masayoshi Takeuchi, Kariya (JP);
Takehiko Sugiura, Kariya (JP);
Nobuhiro Yamauchi, Kariya (JP)

(73) Assignee: Aisin Seiki Kabushiki Kaisha,
Aichi-ken (JP)

( * ) Notice: Subject to any disclaimer, the term of this patent is extended or adjusted under 35 U.S.C. 154(b) by 233 days.

(21) Appl. No.: 11/491,940

(22) Filed: Jul. 25, 2006

(65) Prior Publication Data

US 2007/0022819 A1    Feb. 1, 2007

(30) Foreign Application Priority Data

Jul. 27, 2005    (JP) .............................. 2005-217813

(51) Int. Cl.
*G08B 13/08*    (2006.01)
(52) U.S. Cl. ........................ 340/545.1; 49/27; 73/700;
318/445; 340/425.5; 340/438; 361/181
(58) Field of Classification Search ...... 340/425.5–438,
340/540–545.4, 686.1; 318/432, 445, 469,
318/280; 49/26–28, 209, 360; 73/862.541,
73/756
See application file for complete search history.

(56) References Cited

U.S. PATENT DOCUMENTS

| 4,351,016 | A  | * | 9/1982 | Felbinger ..................... 361/181 |
| 6,339,305 | B1 | * | 1/2002 | Ishihara et al. .............. 318/445 |
| 7,165,457 | B2 | * | 1/2007 | Ogino et al. ................... 73/700 |
| 2004/0125545 | A1 |  | 7/2004 | Kobayashi et al. |

FOREIGN PATENT DOCUMENTS

| JP | 2001-165784 A | 6/2001 |
| JP | 3300660 B2   | 4/2002 |
| JP | 2004-116236 A | 4/2004 |
| JP | 2004-219289 A | 8/2004 |

* cited by examiner

*Primary Examiner*—Brent Swarthout
(74) *Attorney, Agent, or Firm*—Sughrue Mion, PLLC (57) ABSTRACT

An object detecting apparatus includes: a piezoelectric sensor including a first electrode, a piezoelectric material surrounding the first electrode, and a second electrode surrounding the piezoelectric material and provided at an outer edge portion at a side of an opening of a door for a vehicle having a door panel; a signal processing circuit measuring a potential difference between the first electrode and the second electrode; and a connecting line connecting the first electrode and the second electrode to the signal processing circuit.

13 Claims, 8 Drawing Sheets

OBJECT DETECTING APPARATUS

CROSS REFERENCE TO RELATED APPLICATIONS

This application is based on and claims priority under 35 U.S.C. §119 with respect to Japanese Patent Application 2005-217813, filed on Jul. 27, 2005, the entire content of which is incorporated herein by reference.

FIELD OF THE INVENTION

This invention generally relates to an object detecting apparatus, which is provided with: a piezoelectric sensor including a piezoelectric material equipped to an outer edge portion of a door for a vehicle, the door having a door panel formed with a conductive member; and a signal processing circuit which is configured to proceed a pressure-sensitive output signal of the piezoelectric sensor and to output a processed signal employed for determining an entrapment that is the presence of an object sandwiched between the door and a body of the vehicle.

BACKGROUND

As apparatuses which detect the presence of an object (a foreign object) sandwiched between a door and a vehicle body, such as a slide door and a back door, there are object detecting apparatuses which include: 1) a pressure-sensitive sensor provided at an outer edge portion of a door for a vehicle; and 2) a signal processing circuit configured to proceed a pressure-sensitive output signal of the pressure-sensitive sensor. Because a pressure-sensitive sensor such as described above is attached to a door portion which comes in contact with an object when an entrapment (which is a state the object is sandwiched between the door and the vehicle body) occurs, a position of the pressure-sensitive sensor inevitably results in an outer edge portion of the vehicle door which faces an opening of the door. In other words, when such entrapment occurs, there is no need to provide the pressure-sensitive sensor at a portion where the sensor cannot come in contact with the object. A signal processing circuit is configured with electric circuits, which achieve some functions such as amplify a pressure-sensitive output signal. A means for determining an entrapment determines the presence of an entrapment of an object on the basis of a processed signal outputted from the signal processing circuit, e.g., based on whether the processed signal is equal to or greater than a predetermined threshold value.

A pressure-sensitive sensor disclosed in Japanese Patent No. 3300660 includes a sensor body and an outer cover surrounding the sensor body. The outer cover, which is made of an elastic material and exhibits a long tubular shape, possesses a cross-shaped bore which extends along a longitudinal direction of the outer cover. The cross-shaped bore is displaced gradually about an axis of the tubular-shape and is provided, therein, with plural electrical leads, which are spaced, from one another and act as a spirally shaped electrode extending along the longitudinal direction of the cross-shaped bore. Once a load (a compressive force) is applied to this pressure-sensitive sensor in response to an entrapment of an object, the outer cover is elastically deformed and the cross-shaped bore inside the outer cover is compressed or crushed. In such circumstances, two from among the plural electrical leads or all of them, which are arranged inside the cross-shaped bore, may come in contact together. As a result, a pressure-sensitive output signal of the pressure-sensitive sensor is changed between when the pressure-sensitive sensor is not subjected with such load and when is subjected therewith. The pressure-sensitive sensor is at a nonconductive state when it is not subjected with such load, while it is at a conductive state when it is subjected with such load. Therefore, a processed signal outputted by the signal processing circuit varies, and the variation, or a value, of the processed signal is referred to by an object detecting means to determine the presence of an entrapment.

An object detecting apparatus disclosed in JP2001-165784A employs, as a pressure-sensitive sensor, a piezoelectric sensor having a piezoelectric material. Once this piezoelectric sensor is applied with a load (a compressive force) in response to an entrapment, polarization occurs at the piezoelectric material, and a pressure-sensitive output signal outputted by the piezoelectric sensor varies. As a result, a processed signal outputted by the signal processing circuit varies, and the variation, or a value, of the processed signal is referred to by an object detecting means to determine the presence of an entrapment.

As described above, whichever type of pressure-sensitive sensor is employed between the sensors disclosed in Japanese Patent No. 3300660 and in JP2001-165784A, an outer edge portion, at which an entrapment may occur, is equipped with a pressure-sensitive sensor, while a portion, which is not associated with an entrapment, is not equipped therewith. The pressure-sensitive sensor is connected to the signal processing circuit via the outer edge portion of the door.

According to conventional object detecting apparatuses including the above described ones, a signal processing circuit is mounted on an outer edge portion of a door for a vehicle, the outer edge portion which is also provided with a pressure-sensitive sensor. However, it is most likely that any particular water preventions have not been applied to such outer edge portions of the vehicle doors, which are equipped with the pressure-sensitive sensors. Accordingly, there is a danger that the signal processing circuit, which is incorporated with electric circuits, may malfunction due to water, or may be damaged.

Further, because the outer edge portion of the door for the vehicle is not shielded from electromagnetic noise, once the signal processing circuit is influenced by electromagnetic noise, there is a danger that an entrapment may not be detected appropriately.

Still further, in order to detect an entrapment of an object appropriately, the pressure-sensitive sensor is required to be mounted from end to end of the vehicle door, which may constrain a space for the signal processing circuit to be mounted on the outer edge portion. Therefore, where detecting performance of an entrapment is to be improved under such constrain, if the signal processing circuit is attempted to be mounted on the outer edge portion of the vehicle door, it is necessary to downsize the signal processing circuit.

As described above, according to conventional object detecting apparatuses, in which signal processing circuits are attempted to be mounted on outer edge portions of a door for a vehicle, a space for the signal processing circuit is limited, and some drawbacks may occur due to water, electromagnetic noise, or the like, drawbacks which include malfunction or erroneous detection of entrapments.

The present invention has been made in view of the above circumstances, and provides an object detecting apparatus, according to which a space-limitation for a signal processing circuit can be avoided, high waterproof level can be attained, and an entrapment can be detected normally without being influenced by disturbances such as noise.

SUMMARY OF THE INVENTION

According to an aspect of the present invention, an object detecting apparatus includes: a piezoelectric sensor including a first electrode, a piezoelectric material surrounding the first electrode, and a second electrode surrounding the piezoelectric material and provided at an outer edge portion at a side of an opening of a door for a vehicle having a door panel; a signal processing circuit measuring a potential difference between the first electrode and the second electrode; and a connecting line connecting the first electrode and the second electrode to the signal processing circuit.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments will be described hereinbelow with reference to attached drawing figures.

First Embodiment

Figure 1:
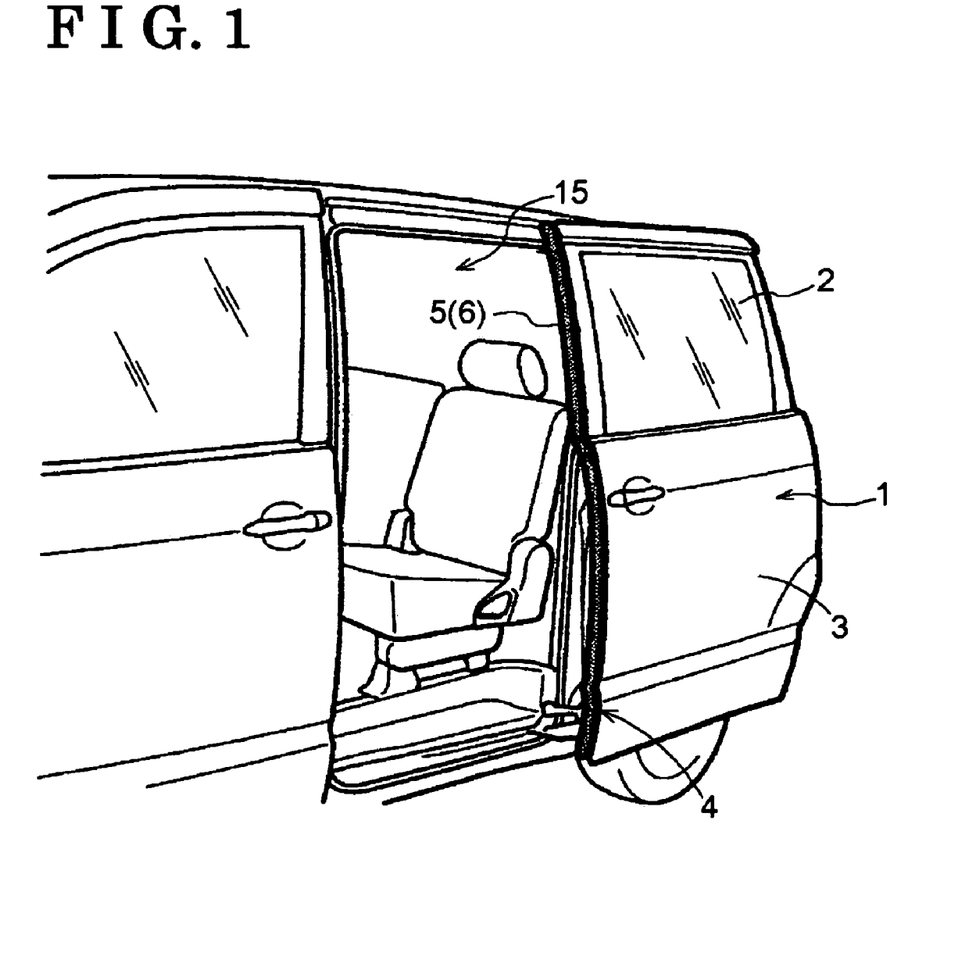
FIG. 1 is a view illustrating a mounted example of a piezoelectric sensor on a door for a vehicle according to a first embodiment of the present invention.
Figure 3:
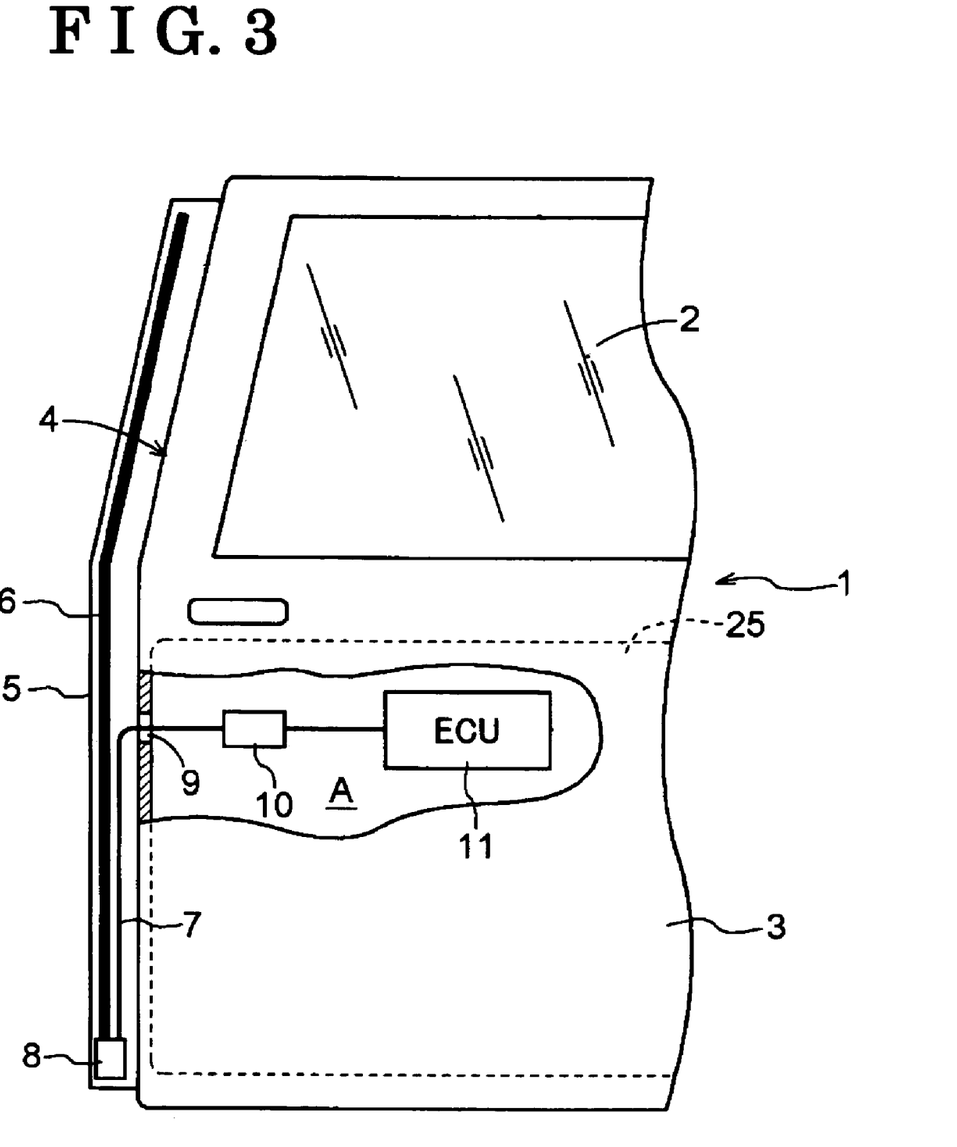
FIG. 3 is a view schematically illustrating an installed example of an object detecting apparatus to the door for the vehicle.

As illustrated in FIG. 1, an opening 15 is defined at a side portion of a vehicle, which allows an occupant to get on and off the vehicle, and which allows an object to be carried in and out. A slide door 1 is provided at the opening 15 as a door for a vehicle. When the slide door 1 is operated for closing, the opening 15 is not defined. Therefore, when the slide door 1 is operated for closing, an occupant or an object (or a foreign object), which is within the opening 15, may on occasions impact with the sliding door 1. An entrapment of an object (including an occupant) is considered to have occurred when an impact between the slide door 1 and an object exists as described above.

Where an entrapment has occurred, it is necessary to suddenly stop the operation of the slide door 1 or to operate the slide door 1 in a reverse direction, for the purpose of preventing the entrapment. In order to achieve this purpose, an object detecting apparatus, which can detect the presence of absence or an entrapment of an object at the slide door 1, is provided. As illustrated in FIGS. 1 and 3, a protector 5, which exhibits resiliency, is fixed to an outer edge portion 4 of the slide door 1. The cable shaped piezoelectric sensor 6 is attached along the outer edge portion 4 of the slide door 1 facing the opening 15 and is housed in the protector 5.

As illustrated in FIGS. 1 and 3, the object detecting apparatus according to the first embodiment of the present invention includes: a piezoelectric sensor 6 provided at the outer edge portion 4 of the slide door 1 facing the opening 15; a detecting circuit portion 10, which is configured to proceed a pressure-sensitive output signal outputted from the piezoelectric sensor 6 and to output a processed signal according to which the presence or absence of an entrapment of an object by the slide door 1 can be determined. The detecting circuit portion 10 acts as a signal processing circuit of the present invention.

Figure 2:
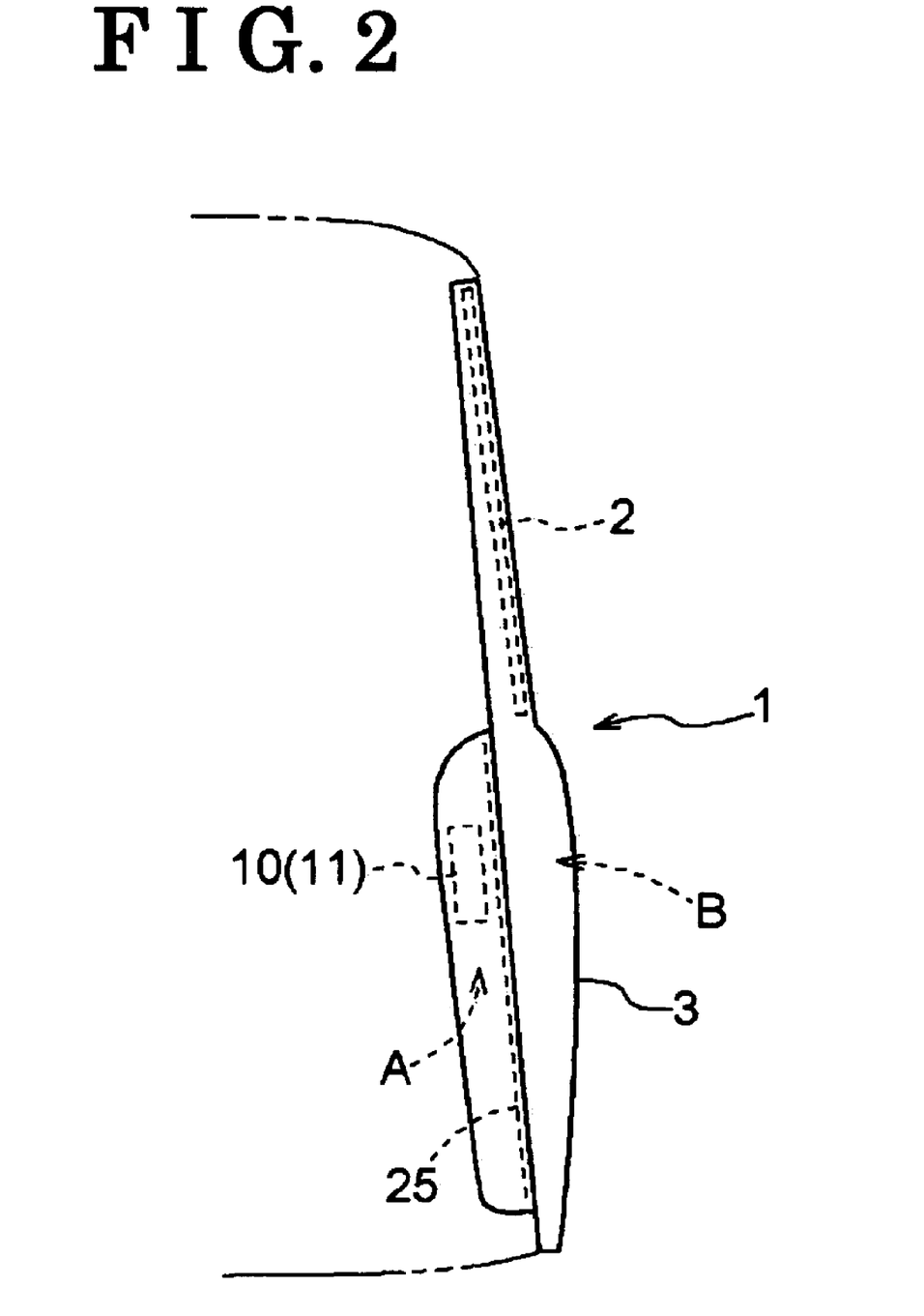
FIG. 2 is a cross sectional view illustrating the door for the vehicle.

As illustrated in FIGS. 1, 2 and 3, the slide door 1 is provided with: a window pane 2, which is attached at an upper portion of the slide door 1 and is movable up and down in a vertical direction; and a door panel 3, which is arranged to an underpart of the slide door 1. At least an inner portion of the door panel 3 is formed with conductive members. As we can see from FIG. 2, an inner space of the door panel 3 includes an inner space A, which is positioned at an inner side of the vehicle, and an inner space B, which is positioned within the door toward an outer side of the vehicle. The window pane 2 can slidably enter in and retract from the inner space B. The inner space A is surrounded by conductive members and is separated from the inner space B by a partition. The inner space A can be water-prevented by a waterproofing member 25 of sheet shape attached to the partition. The waterproofing member 25 is formed with a resin film.

Figure 4:
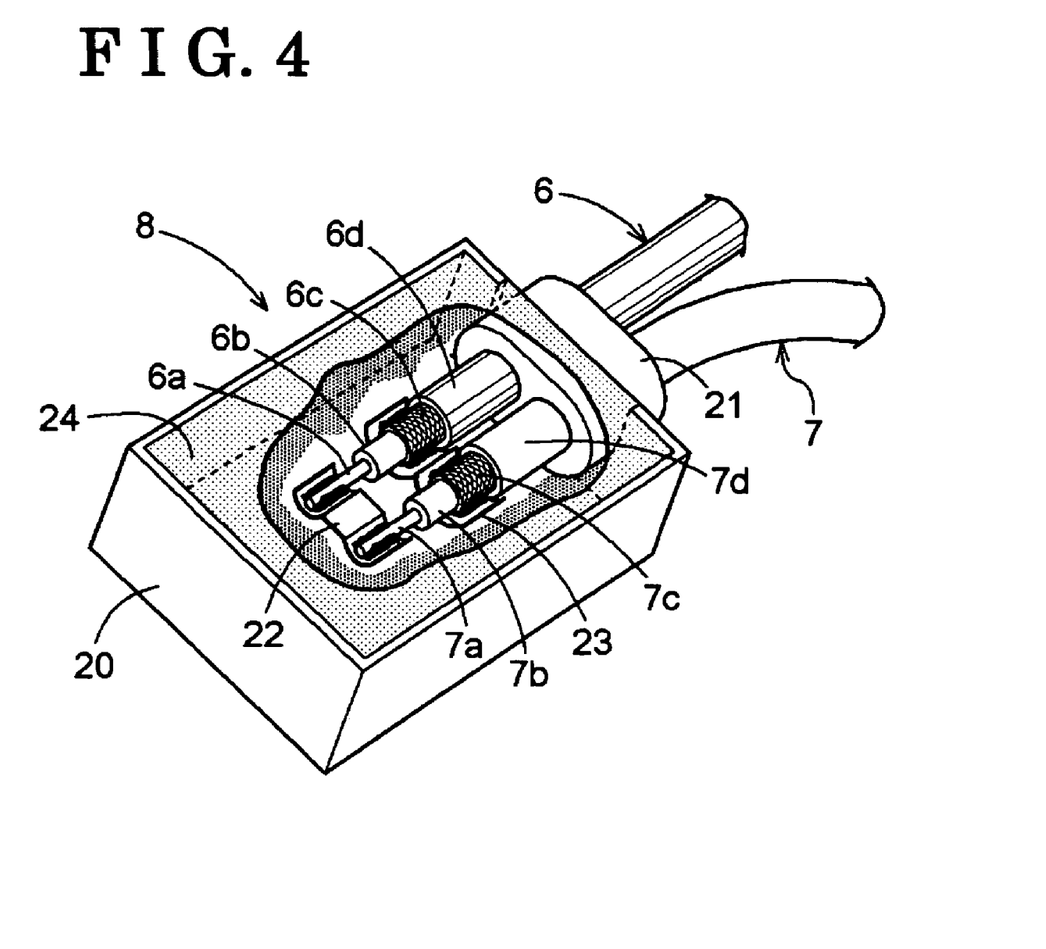
FIG. 4 is a perspective view illustrating a connector for connecting the piezoelectric sensor to a signal connecting line.

As illustrated in FIG. 4, the piezoelectric sensor 6 is structured with a piezoelectric material 6b, at which, in response to an impact between the piezoelectric material 6b and an object, electric polarization occurs due to piezoelectric effect and electric charge is generated. At a center of the cable shaped piezoelectric sensor 6, there is a wire shaped center electrode 6a (a first electrode), the center electrode 6a of which circumference is surrounded by a piezoelectric material 6b. A circumference of the piezoelectric material 6b is coated with an external electrode 6c (a second electrode) which serves as an electrode opposed to the center electrode 6a. As a result, the piezoelectric material 6b is positioned between the wire shaped center electrode 6a and the hollow-cylindrical shaped external electrode 6c. A circumference of the external electrode 6c is coated by an external cover 6d possessing an insulating property.

More specifically, when an external force is applied to the piezoelectric material 6b of the piezoelectric sensor 6, for example due to an impact between the piezoelectric sensor 6 and an object, at the piezoelectric material 6b, polarization occurs due to piezoelectric effect and electric charge is generated. The electric charge generated due to piezoelectric effect is outputted as a pressure-sensitive output signal which is expressed in terms of a variation of an electric potential difference between the center electrode 6a and the external electrode 6c. Therefore, when the slide door 1 is operated for closing at a state where an object is present at the opening 15, an external force is applied to the piezoelectric sensor 6 in response to an impact of the object against the piezoelectric sensor 6, as a result, the electric charge generated at the piezoelectric material 6b is outputted to an exterior of the piezoelectric sensor 6. In this case, an amount of electric charge generated polarization of the piezoelectric material 6b is higher in response to an increase in an amount of external force (acceleration) loaded to the piezoelectric material 6b. Therefore, because a degree of an external force (acceleration) loaded to the piezoelectric material 6b is inevitably raised in response to an entrapment by the slide door 1, an amount of electric charge (pressure-sensitive output signal) generated due to polarization at the piezoelectric material 6b is increased. On the other hand, for example, when no external force is applied to the piezoelectric material 6b, or when a very minimal degree of external force is applied thereto, an amount of electric charge generated due to polarization at the piezoelectric material 6b becomes less. That is, the piezoelectric sensor 6 having the piezoelectric material 6b is structured in such a manner that an electrical potential difference between the center electrode 6a and the external electrode 6c varies in response to a degree of external force, and a pressure-sensitive output signal is outputted from the piezoelectric sensor 6 in response to a degree of acceleration applied thereto.

The detecting circuit portion 10 is configured to proceed a pressure-sensitive output signal outputted from the piezoelectric sensor 6 and to output a processed signal which can be referred to in order to determine whether an entrapment of an object by the slide door 1 has occurred. For example, the detecting circuit portion 10 outputs a processed signal obtained by amplifying a pressure-sensitive output signal and controls an ECU (electronic control unit) 11 to determine the presence or absence of an entrapment on the basis of the processed signal. When the ECU 11 determines the presence of an entrapment of an object by the slide door 1, i.e., determines that an entrapment of an object by the slide door 1 has occurred, the ECU 11 transmits, to a motor for the slide door 1, a signal for operating the slide door 1 in a reverse direction. As described above, the ECU 11 serves as an entrapment determining means of the present invention.

FIG. 4 is a perspective view illustrating a connector 8 which serves as a connecting means for connecting the piezoelectric sensor 6 to a connecting line 7 at a lower end portion of the outer edge portion 4. The connecting line 7 transmits a pressure-sensitive output signal outputted from the piezoelectric sensor 6 to the detecting circuit portion 10. The connecting line 7 is arranged to extend from the outer edge portion 4 of the slide door 1 to the inner space A and is configured to transmit a pressure-sensitive output signal from the piezoelectric sensor 6 to the detecting circuit portion 10. The connector 8 is provided with a bush 21 for drawing, side by side, the piezoelectric sensor 6 and the connecting line 7 into a case 20 made of conductive material. The bush 21 is incorporated, therein, at least one through hole into which the piezoelectric sensor 6 and the connecting line 7 are inserted together. The piezoelectric sensor 6 and the connecting line 7 are fitted into a side surface of the case 20 and are fixed thereto in a state where they are inserted into the through hole.

Inside the case 20, as for the piezoelectric sensor 6, the piezoelectric material 6b, which covers the center electrode 6a, and the external cover 6d, which covers the external electrode 6c, are partially cut out in such a manner that ends of the center electrode 6a and the external electrode 6c are exposed respectively. Likewise, as for the connecting line 7, an insulating body 7b, which surrounds and covers a center conductor 7a (a first conductor), and an external cover 7d, which surrounds and covers an external conductor 7c (a second conductor), are partially cut out in such a manner that ends of the center conductor 7a and the external conductor 7c are exposed respectively. As described above and as illustrated in FIG. 4, the connecting line 7 is a coaxial cable having the center conductor 7a, the insulating body 7b, the external conductor 7c and the external cover 7d. The ends of the piezoelectric sensor 6 and the connecting line 7 are exposed in the same direction, and the center electrode 6a of the piezoelectric sensor 6 and the center conductor 7a of the connecting line 7 are electrically connected at their tip end sides via a conductive connecting member 22. Further, the external electrode 6c of the piezoelectric sensor 6 and the external conductor 7c of the connecting line 7 are electrically connected via a conductive connecting member 23. According to the first embodiment of the present invention, the center electrode 6a of the piezoelectric sensor 6 and the center conductor 7a of the connecting line 7 are connected to the connecting member 22 by means of welding. Likewise, the external electrode 6c of the piezoelectric sensor 6 and the external conductor 7c of the connecting line 7 are connected to the connecting member 23 by means of welding. Alternatively or in addition, conductivity can be established by mechanically interposing each electrode 6a and 6c and each conductor 7a and 7c by means of the connecting member 22 and the connecting member 23. Further, it is possible to enhance shielding effect by electrically connecting the connecting member 23 to the case 20.

In the connector 8 with the above-described structure, the piezoelectric sensor 6 and the connecting line 7 can be electrically connected to each other in a state where they are fixed to the case 20 by the bush 21 so that they do not oscillate each other. Further, a sealing layer 24, which seals the connector 8, is formed or molded by feeding a sealing member such as an insulated resin into the case 20. As the sealing member, silicon resin can be used. As a result, conductive members, such as the center electrode 6a, the external electrode 6c, the center conductor 7a, the external conductor 7c, the connecting member 22 and the connecting member 23, are sealed by the sealing layer 24, and waterproofing can be maintained. Further, the conductive members, such as the center electrode 6a, the external electrode 6c, the center conductor 7a, the external conductor 7c, the connecting member 22 and the connecting member 23, are secured by the sealing layer 24, and that they are configured so as not to oscillate relatively.

It is preferable that a sealing member, which configures the sealing layer 24, is transparent in a state where it is hardened. If that is so, it is possible to for an operator to recognize visually a connected condition between the center electrode 6a and the center conductor 7a via the connecting member 22 and a connected condition between the external electrode 6c and the external conductor 7c via the connecting member 23.

Going back to FIG. 3, the connecting line 7 drawn from the connector 8 extends an inside of the protector 5 and then reaches the inner space A through a hole 9 defined at the outer edge portion 4 of the slide door 1. As described above, the inner space A is surrounded by conductive members for the door panel 3 and is separated from the inner space B by the partition. A waterproofing property of the inner space A is maintained at a high level by the waterproofing member 25 of sheet shape at the partition arranged at an outer side of the inner space A. The inner space A houses, therein, the detecting circuit portion 10 and the ECU 11 which are connected to the connecting line 7.

As described above, in the object detecting apparatus according to the first embodiment of the present invention, the piezoelectric sensor 6 is provided only at the outer edge portion 4 of the slide door 1, at which the occurrence of an entrapment is possible, and other portions, at which the occurrence of an entrapment may not occur, are not subjected by sensibility of the piezoelectric sensor 6. That is, according to the structure of the object detecting apparatus described above, it is possible to restrain an occurrence of noise resulting from the piezoelectric sensor 6.

The piezoelectric sensor 6 is connected to the connecting line 7 at the outer edge portion 4 of the slide door 1. The connecting line 7 is connected to the detecting circuit portion 10 in a state where the connecting line 7 has been introduced into the inner space A which is surrounded by the conductive members and exhibits high waterproofing property by virtue of the waterproofing member 25 provided at the partition outside the door. Therefore, because electromagnetic waves are absorbed or reflected by the conductive members, the detecting circuit portion 10 is not easily influenced by electromagnetic noise transmitted from the outside. Further, because the detecting circuit portion 10 is not easily influenced by moisture, malfunction or breakdown due to moisture can be restrained, and normal entrapment detection can be implemented.

Further, comparing with a conventional structure, in which the detecting circuit portion 10 is provided at the outer edge portion 4 of the slide door 1, the detecting circuit portion 10 provided inside the inner space A of the first embodiment is not easily transmitted with large impact which may occur, for example when the slide door 1 is operated for closing, when a leg of an occupant comes in contact with the slide door 1, or the like. That is, because the detecting circuit portion 10 is provided inside the inner space A of the door panel 3, such impact is transmitted to the detecting circuit portion 10 via the protector 5 and the door panel 3. However, such impact is not large enough to oscillate the door panel 3, and the detecting circuit portion 10 is not oscillated largely. Therefore, a possibility that the detecting circuit portion 10 may be damaged due to an impact force transmitted from the outside can be precluded or restrained. Additionally, because the detecting circuit portion 10 of the first embodiment is rarely required to exhibit high waterproofing and impact resistance, performance tests associated therewith are not needed. As a result, a manufacturing cost of an object detecting sensor can be reduced.

Further, the detecting circuit portion 10 according to the first embodiment is housed in the inner space A of the door panel 3 which ensures a wide space. Substantially, there is no limitation to a mounting space for the detecting circuit portion 10. Therefore, it is possible to design the detecting circuit portion 10 without considering a lamination of size.

Still further, the connector 8, in which the piezoelectric sensor 6 is connected to the connecting line 7, can be mounted on the outer edge portion 4 of the slide door 1 in a state where the piezoelectric sensor 6 and the connecting line 7 are arranged adjacently and in parallel to each other. Therefore, because a width of the connector 8 can be reduced, even if there is no large space on the outer edge portion 4, the piezoelectric sensor 6 and the connecting line 7 can be connected to each other via the connector 8. In addition, because the connector 8 is sealed by the sealing layer 24 made of a sealing member such as resin, it is possible to insulate or electrically isolate a connecting portion between the piezoelectric sensor 6 and the connecting line 7 from the outside, thereby enabling to enhance vibration resistance.

Second Embodiment

An object detecting apparatus according to a second embodiment of the present invention is different from the one of the first embodiment, in terms of a structure of a connecting line. The following description is given for the object detecting apparatus of the second embodiment, and the description for the same structure as the first embodiment will be omitted herein.

Figure 5:
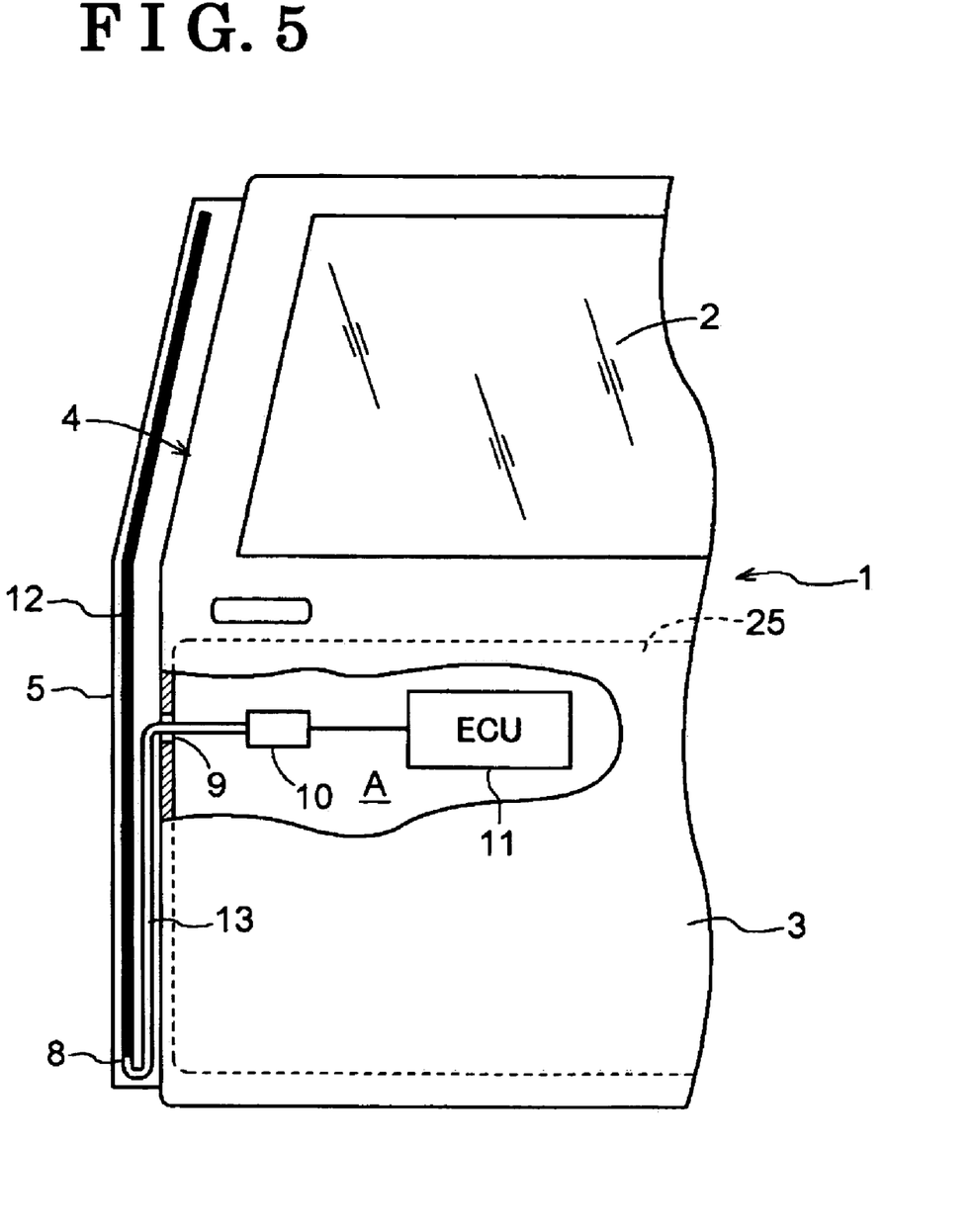
FIG. 5 is a view schematically illustrating a mounted example of an object detecting apparatus according to a second embodiment.

In FIG. 5, a connecting line 13, which transmits a pressure-sensitive output signal of a piezoelectric sensor 12 to the detecting circuit portion 10, and the piezoelectric sensor 12 are made of a single and long member. More specifically, the piezoelectric sensor 12 is manufactured by applying direct high electrical field to a cable shaped material including a ferroelectric substance and by polarizing for giving piezoelectric activity to the ferroelectric substance. Therefore, the cable shaped material, which has not been polarized, exhibits the same characteristics as a material including a normal ferroelectric substance.

Therefore, in the object detecting apparatus according to the second embodiment, the cable-shaped material, which is arranged at a portion of the outer edge portion 4 of the slide door 1 at which an entrapment may occur, is polarized and is adjusted to act as the piezoelectric sensor 12. on the other hand, the cable-shaped material, which is arranged at a different portion at which an entrapment may not occur, is not polarized and is adjusted to act as the connecting line 13. In other words, although the connecting line 13 and the piezoelectric sensor 12 are made of a single and long member, a sensitivity of the sensor 12, these is no need to prepare for equipments or troubles for connecting the connecting line 13 is set lower than that of the piezoelectric sensor 12.

Further, it is possible to prevent noise from being transmitted to the pressure-sensitive output signal of the piezoelectric sensor 12 while the pressure-sensitive output signal is being transmitted from the outer edge portion 3 of the slide door 1 to the inner space A of the door panel 3 via the connecting line 13.

Another Embodiments

Figure 6:
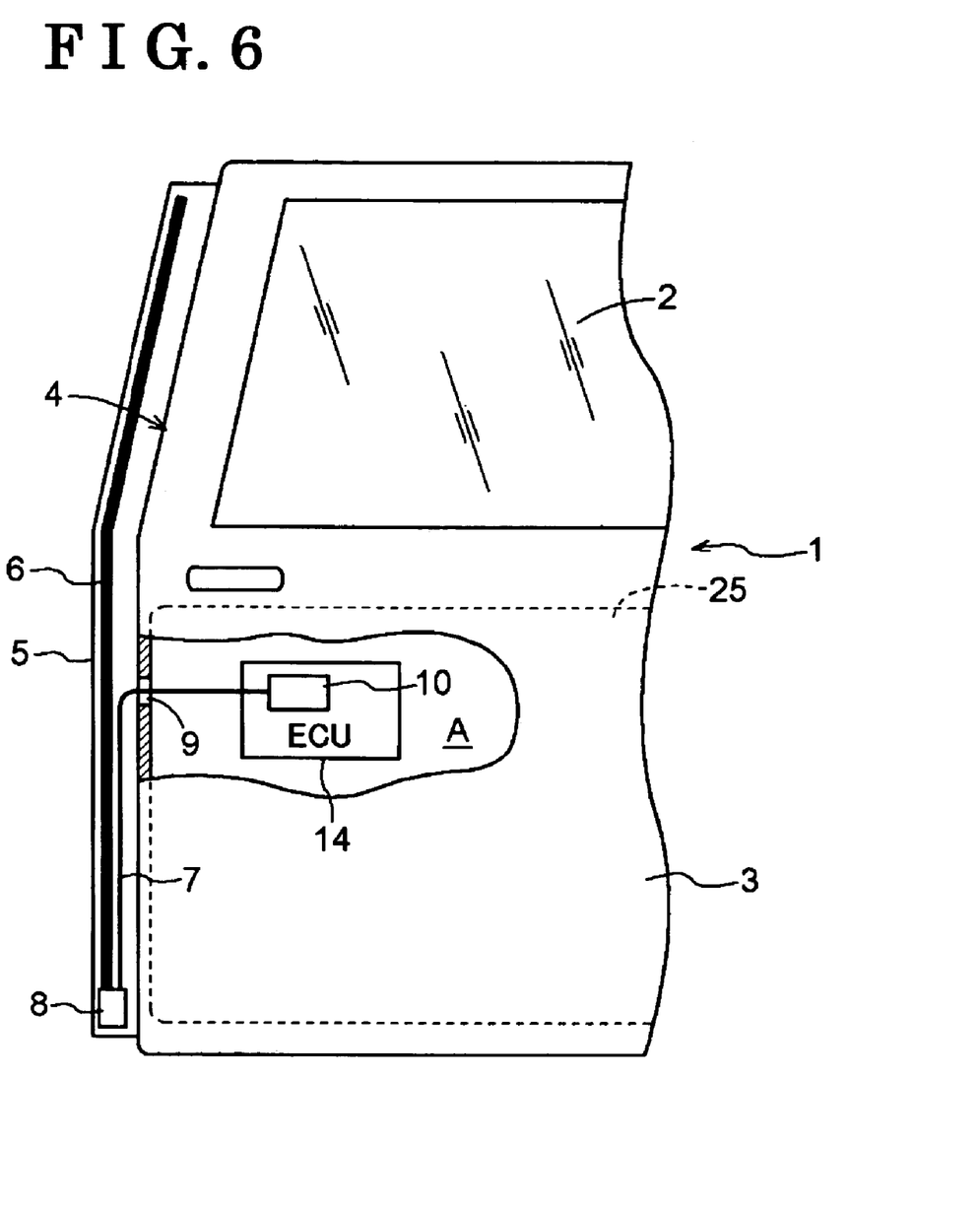
FIG. 6 is a view schematically illustrating a mounted example of an object detecting apparatus according to another embodiment.

[1] According to the first and second embodiments, the ECU 11 is a separated body from the detecting circuit portion 10. However, as illustrated in FIG. 6, the detecting circuit portion 10 can be integrated with an ECU 14. For example, the detecting circuit portion 10 can be provided on the same circuit board as the one for the ECU 14. Alternatively, a circuit board, at which the detecting circuit portion 10 is structured, can be housed in a case in which a circuit board, at which the ECU 14 is structured, is housed. Therefore, because the detecting circuit portion 10, which serves as the signal processing circuit of the present invention, is integrated with the ECU 14, which serves as the object detecting means of the present invention, the structure of the object detecting apparatus can be simplified. Further, if the detecting circuit portion 10 is integrated with the ECU 14, the ECU 14 can freely change a condition for a signal processing implemented by the detecting circuit portion 10. For example, when the detecting circuit portion 10 amplifies a pressure-sensitive output signal of the piezoelectric sensor 6, the ECU 14 can change a gain for amplifying at the detecting circuit portion 10, can adjust a size of the processed signal outputted from the detecting circuit portion 10, and can determine appropriately the presence or absence of an entrapment of an object.

[2] According to the first and second embodiments and the above describe another embodiment, the connector 8, which serves as the connecting means for connecting the piezoelectric sensor 6 to the connecting line 7, is attached to a lower end portion of the edge portion 4 of the slide door 1. Alternatively, the connector 8 can be attached to an upper end portion of the edge portion 4 of the slide door 1. However, because it is preferable that the piezoelectric sensor 6 is provided at a large area of the edge portion 4 of the slide door 1 at which an entrapment of an object may occur, it is necessary to keep an area, at which the connector 8 is provided, as narrow as possible. Alternatively, it is preferable that the connector 8 is provided at a portion of the edge portion 4 of the slide door 1 where a possibility of an entrapment of an object is low.

[3] According to the first and second embodiments and another embodiments described above, the object detecting apparatus is provided at the outer edge portion of the slide door. However, this object detecting apparatus can be applied for detecting an entrapment of an object at a back door, which is provided at a rear portion of a vehicle, at a swing door provided at a side of a vehicle, or the like.

[4] According to the first and second embodiments and another embodiments described above, the connecting line 7 is employed between the piezoelectric sensor 6 and the detecting circuit portion 10 serving as the signal processing circuit. Instead of this coaxial cable 7, a shielded wire can be employed, which includes, therein, a signal line for transmitting signals of the center electrode 6a and the external electrode 6c of the piezoelectric sensor 6 to the detecting circuit portion 10. Further, instead of this coaxial cable 7, an only signal line for transmitting signals of the center electrode 6a and the external electrode 6c of the piezoelectric sensor 6 can be employed as far as it is employed under an environment in which noise applied thereto can be ignored.

Figure 7:
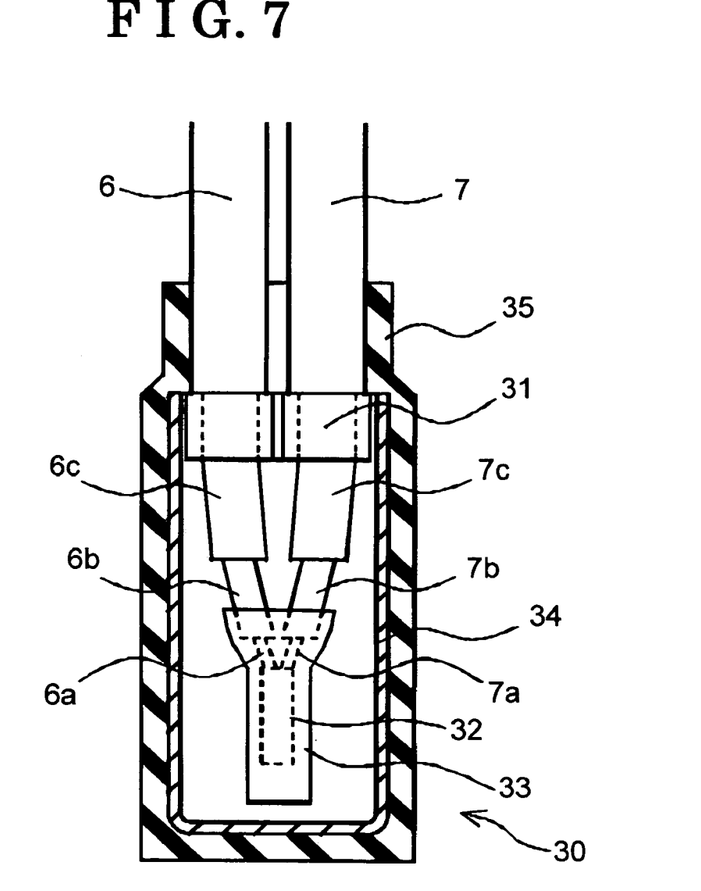
FIG. 7 is a view illustrating a structure of another connector for connecting the piezoelectric sensor to the signal connecting line.
Figure 8:
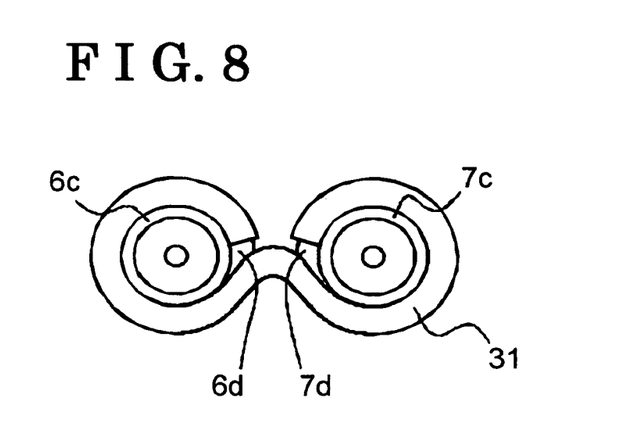
FIG. 8 is a sectional view illustrating a W-shaped splicing fitting provided in the connector illustrated in FIG. 7.
Figure 9:
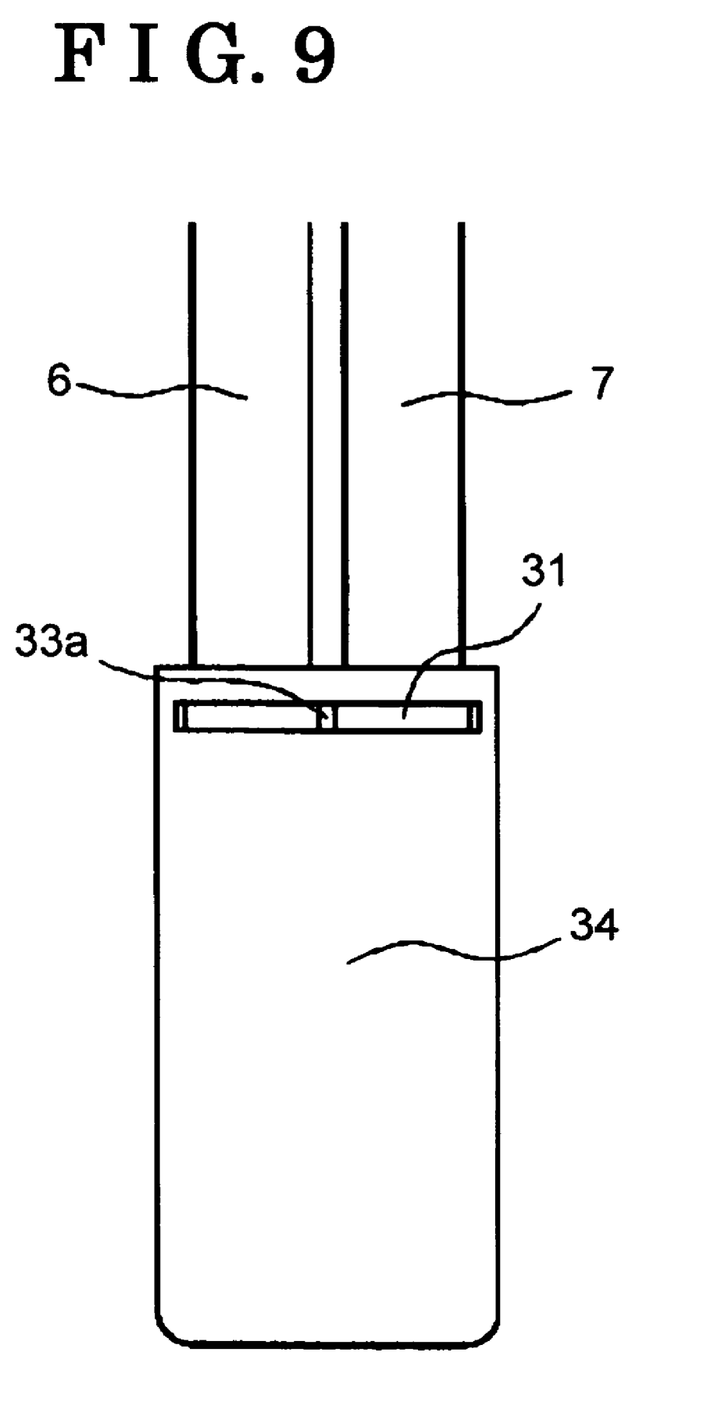
FIG. 9 is a view illustrating an outer appearance of a cap covering the piezoelectric sensor and the connecting line and provided in the connector illustrated in FIG. 7.

[5] According to the first and second embodiments and another embodiments described above, a connector 30 illustrated in FIGS. 7, 8 and 9 can substitute the connector 8. As is obvious from FIG. 7, the connector 30 includes a W-shaped splicing fitting 31 by which the external electrode 6c and the external conductor 7c are bound up and spliced in a condition where both ends of the piezoelectric sensor 6 and the connecting line 7 are exposed with covers being cut out. The connector 30 further includes a splice 32 by which the center electrode 6a and the center conductor 7a are electrically connected to each other at their tip ends. Under the circumstance where the W-shaped splicing fitting 31 and the splice 32 are attached, once the tip ends of the piezoelectric sensor 6 and the connecting line 7 are soaked in a solder bath, the external electrode 6c, the external conductor 7c and the W-shaped splicing fitting 31 are secured by solder, and the center electrode 6a, the center conductor 7a and the splice 32 are secured by solder as well. The piezoelectric material 6b and the insulating body 7b respectively include a property that solder is not applied thereto, and so there is no solder thereon. Subsequently, a heat shrinkable tube 33 is provided so as to cover an outside of the center electrode 6a, the center conductor 7a and the splice 32, and tip ends of these components are heated up and insulated. Further, a cylindrical-shaped conductive cap 34 having a bottom is provided so as to cover the splice 32 and the W-shaped slicing fitting 31. As illustrated in FIG. 9, the cap 34 includes grooves 44a which are defined along its periphery and positioned corresponding to the W-shaped slicing fitting 31. Solder is fed through these grooves 33a, and a space between the W-shaped slicing fitting 31 and the cap 34 are secured. Therefore, conductivity can be maintained between the W-shaped slicing fitting 31 and the cap 34. As a finishing, a heat shrinkable tube 35 is provided so as to cover the cap 34 and the entire structure of the connector 30 is heated up and secured. The cap 34 exhibits the same electrical potential as the external electrode 6c and the external conductor 7c, and an inside of the cap 34 is shielded. Therefore, it is possible to prevent noise from invading into tip ends of the center electrode 6a and the center conductor 7a.

According to the above-described embodiments of the present invention, because there is a connecting line between a piezoelectric sensor and a signal processing circuit, the signal processing circuit can be positioned at a distance from a vicinity of the piezoelectric sensor and from an outer edge portion of an opening of a door for a vehicle. Therefore, it is possible to provide water-proofing of the signal processing circuit or to solve a noise matter. Further, even if the signal processing circuit is upsized, it is not a big matter.

It is preferable that the connecting line is a shielded wire. Therefore, it is possible to prevent noise from being superimposed on the connecting line.

It is further preferable that the connecting line includes a first conductor, an insulating body surrounding the first conductor, and a second conductor surrounding the insulating body. The first electrode of the piezoelectric sensor can be connected to the first conductor of the connecting line, and the second electrode of the piezoelectric sensor can be connected to the second electric conductor of the connecting line. According to this structure, the second electrode of the piezoelectric sensor becomes potential-equal to the second conductor of the connecting line. The first electrode and the first conductor are electrically shielded. Therefore, it is possible to transmit accurately, to the signal processing circuit, a potential difference between the first electrode of the piezoelectric sensor and the second electrode thereof. Even if an external force is applied to the connecting line, the force does not influence much to a signal transmitting inside of the connecting line, and a sensitivity of the connecting line becomes lower than the one of the piezoelectric sensor. Therefore, it is possible to hardly apply noise to the pressure-sensitive output signal.]

It is further preferable that the signal processing circuit is housed in an inner space of the door panel, the connecting line extends from the outer edge portion of the door for the vehicle to the signal processing circuit, and the signal processing circuit is shielded from water by a waterproof sheet. According to this structure, the size of the signal processing circuit is less limited than where the signal processing circuit is positioned at the outer edge portion of the vehicle door. Because the signal processing circuit is located at the inside that has been made waterproof the signal processing circuit is not influenced by water. Therefore, it is possible to preclude an occurrence of a malfunction or damage of an electric circuit configuring the signal processing circuit. In addition, because the signal processing circuit itself is hardly required to be made waterproof, there is no need to have a waterproof test in advance. As a result, it is possible to reduce a manufacturing cost of an object detecting apparatus.

Further, because the signal processing circuit is located at an inside of the door panel that assures a large space, substantially, there is no limitation to the locating space of the signal processing circuit. Therefore, it is possible to design the signal processing circuit without a size limitation. When the door panel is formed with a conductive member, electromagnetic waves are absorbed or reflected by the conductive members. As a result, the signal processing circuit is not easily influenced by electromagnetic noise from other electric components, and so an entrapment can be detected in a normal manner.

It is further preferable that the insulating body of the connecting line includes a ferroelectric substance, and the piezoelectric sensor includes a material identical to a material of the connecting line and is manufactured by polarizing a ferroelectric portion. According to this structure, the object detecting apparatus can be manufactured: by preparing the same material for the piezoelectric sensor and the connecting line and by changing a portion for the piezoelectric sensor to a piezoelectric material. Therefore, it is possible to reduce the cost for the material to be prepared. Further, it is possible to reduce a consideration about an influence due to a different material.

It is further preferable that the piezoelectric sensor and the connecting line are made of the same and single cable, and the piezoelectric sensor is manufactured by polarizing a portion of the cable. According to this structure, it is possible to reduce a connecting step between the piezoelectric sensor and the connecting line, by changing the portion of the single cable to a piezoelectric sensor. Further, there is no need to consider water-proofing of a connecting portion of the piezoelectric sensor and the connecting line, and no need to consider a mounting space of the connecting portion.

It is further preferable that a member made of a material identical to the material of the connecting line and separated from the connecting line is prepared, and the piezoelectric sensor is formed by polarizing entirely the member. According to this structure, it is possible to clearly distinguish a portion of the piezoelectric sensor from a portion of the connecting line, and the piezoelectric sensor can be provided only to a portion that should detect an entrapment.

It is further preferable that the piezoelectric sensor is manufactured by applying direct high electric filed to the connecting cable having the ferroelectric substance and offering a piezoelectric activity to the ferroelectric substance. According to this structure, it is possible to establish the piezoelectric sensor reliably.

It is further preferable that ends of the piezoelectric sensor and the connecting cable are connected to each other inside a case being sealed. According to this structure, it is possible to make waterproofing to a connecting portion between the piezoelectric sensor and the connecting line.

It is further preferable that the end of the piezoelectric sensor is exposed in a same direction as an exposing direction of the end of the connecting cable, the first electrode is connected to the first conductor at respective tip ends at respective exposing directional sides, and the second electrode is connected to the second conductor at a side opposite to the exposing directional sides. According to this structure, it is possible to draw the piezoelectric sensor and the connecting line from a single directional surface to the case, and the case can be positioned at an end of the door for the vehicle. Therefore, it is possible to extend the piezoelectric sensor at an approximately entire outer edge portion at the side of the opening of the door for the vehicle, thereby enabling to expand an area in which an entrapment can be detected. Further, there is no need to for the piezoelectric sensor to have a bent portion, apart from a portion extending along the outer edge portion of the door for the vehicle. In this case, because there is no need to bend the piezoelectric sensor into an approximately U-shaped structure, an extra load is not applied to the piezoelectric sensor in a static state in which no entrapment is detected, and a detecting precision can be improved. Further, because the case is formed with electric conductors, it is possible to shield each exposed centerline of the piezoelectric sensor and the connecting line.

It is further preferable that the door for the vehicle is a slide door provided at a side surface of the vehicle, and the case is located at a lower portion at the side of the opening of the slide door. According to this structure, the case can be provided at a lower portion of the slide door which has a relatively excessive room.

The principles of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An object detecting apparatus, comprising:
    a piezoelectric sensor including a first electrode having an end portion, a piezoelectric material surrounding the first electrode, and a second electrode having an end portion and surrounding the piezoelectric material, the piezoelectric sensor being adapted for being provided at an outer edge portion at a side of an opening of a door for a vehicle having a door panel;
    a signal processing circuit measuring a potential difference between the first electrode and the second electrode;
    a connecting line for connecting the first electrode and the second electrode to the signal processing circuit, the connecting line being in the form of a shield wire and including a first conductor having an end portion, an insulating body surrounding the first conductor, and a second conductor surrounding the insulating body and having an end portion;
    a case;
    a bush fixedly mounted at one end of the case and having holes through which the piezoelectric sensor and the connecting line extend, in a spaced parallel mode, into the case;
    a first conductive connecting member provided in the casing and electrically connected between the end portion of the first electrode of the piezoelectric sensor and the end portion of the first conductor of the connecting line; and
    a second conductive connecting member provided in the casing and electrically connected between the end portion of the second electrode of the piezoelectric sensor and the end portion of the second conductor of the connecting line.

2. An object detecting apparatus according to claim 1, wherein the case is formed into a water-proof structure.

3. An object detecting apparatus according to claim 1, wherein the signal processing circuit is housed in an inner space of the door panel, the connecting line extends from the outer edge portion of the door for the vehicle to the signal processing circuit, and the signal processing circuit is shielded from water by a waterproof sheet.

4. An object detecting apparatus according to claim 1, wherein the insulating body of the connecting line includes a ferroelectric substance, the piezoelectric sensor includes a material identical to a material of the connecting line and is manufactured by polarizing a ferroelectric portion.

5. An object detecting apparatus according to claim 4, wherein the piezoelectric sensor and the connecting line are made of a same and single cable, and the piezoelectric sensor is manufactured by polarizing a portion of the cable.

6. An object detecting apparatus according to claim 4, wherein the piezoelectric sensor includes a member made of a material identical to the material of the connecting line and separated from the connecting line and is formed with the member entirely polarized.

7. An object detecting apparatus according to claim 4, wherein the piezoelectric sensor is manufactured by applying direct high electric field to the connecting line having the ferroelectric substance and offering a piezoelectric activity to the ferroelectric substance.

8. An object detecting apparatus according to claim 1, wherein the door for the vehicle is a slide door provided at a side surface of the vehicle, and the case is located at a lower portion at the side of the opening of the slide door.

9. An object detecting apparatus according to claim 1, wherein the piezoelectric sensor is a coaxial cable having the first electrode, the piezoelectric material and the second electrode.

10. An object detecting apparatus comprising:
   a piezoelectric sensor including a first electrode, a piezoelectric material surrounding the first electrode, and a second electrode surrounding the piezoelectric material and provided at an outer edge portion at a side of an opening of a door for a vehicle having a door panel;
   a signal processing circuit measuring a potential difference between the first electrode and the second electrode; and
   a connecting line connecting the first electrode and the second electrode to the signal processing circuit,
   the connecting line including a first conductor, an insulating body surrounding the first conductor, and a second conductor surrounding the insulating body, the first electrode of the piezoelectric sensor being connected to the first conductor of the connecting line, and the second electrode of the piezoelectric sensor being connected to the second electric conductor of the connecting line, and
   wherein the insulating body of the connecting line includes a ferroelectric substance, the piezoelectric sensor includes a material identical to a material of the connecting line and is manufactured by polarizing a ferroelectric portion.

11. An object detecting apparatus according to claim 10, wherein the piezoelectric sensor and the connecting line are made of a same and single cable, and the piezoelectric sensor is manufactured by polarizing a portion of the cable.

12. An object detecting apparatus according to claim 10, wherein the piezoelectric sensor includes a member made of a material identical to the material of the connecting line and separated from the connecting line and is formed with the member entirely polarized.

13. An object detecting apparatus according to claim 10, wherein the piezoelectric sensor is manufactured by applying direct high electric filed to the connecting cable having the ferroelectric substance and offering a piezoelectric activity to the ferroelectric substance.

* * * * *